Jan. 12, 1971  C. N. PREMO  3,553,772
BEAD EXHAUST ASSEMBLY FOR A MOLDING MACHINE
Filed Sept. 3, 1968  2 Sheets-Sheet 1

INVENTOR.
CHARLES N. PREMO
BY Kenwood Ross and
Chester E. Flavin
ATTORNEYS.

Jan. 12, 1971   C. N. PREMO   3,553,772
BEAD EXHAUST ASSEMBLY FOR A MOLDING MACHINE
Filed Sept. 3, 1968   2 Sheets-Sheet 2

INVENTOR.
CHARLES N. PREMO
BY *Kenwood Ross and
Chester E. Flavin*
ATTORNEYS.

United States Patent Office 3,553,772
Patented Jan. 12, 1971

3,553,772
BEAD EXHAUST ASSEMBLY FOR A
MOLDING MACHINE
Charles N. Premo, Springfield, Mass., assignor, by mesne assignments, to Koehring Company, Milwaukee, Wis., a corporation of Wisconsin
Filed Sept. 3, 1968, Ser. No. 756,747
Int. Cl. B29c 11/00
U.S. Cl. 18—5                                          3 Claims

ABSTRACT OF THE DISCLOSURE

An assembly for the exhausting of the surplusage of plastic beads from a foam molding machine following the cavity-charging operation for the return thereof to the bead supply for reuse in a subsequent cavity-charging operation and adapted for interchangeable use irrespective of whether the cooperant molding machine slide runner is located on the stationary mold half or on the movable mold half of the foam molding machine.

BACKGROUND OF THE INVENTION

Field of the invention

The invention relates generally to improvements in foam molding machine constructions as used in connection with the molding of charges of plastic pellets, such as of polystyrene, in enclosed or shaped mold cavities.

Description of the prior art

In foam molding, beads or pellets of plastic material, such as polystyrene, are normally initially expanded or prefoamed before molding by an expanding gas, the beads being brought to an intermediate temperature on the order of 190° F. and below their maximum foaming temperature on the order of from 230° to 240°, so that they swell to an intermediate size of handling ease. The so-swollen beads are then charged under pressure into a closed mold cavity where a subsequent application of heat softens the beads and the resultant evolution of gas therewithin accomplishes their expansion, wherefor they fuse to and coalesce with each other to form a strong, light, resinous, shaped foam possessive of a discrete closed-cell structure having a shape as determined by the configuration of the mold cavity.

The molds consist of opposing and complementary mold halves which close as to each other to form the molding cavity or cavities, it being usual to close the mold halves for charging preliminary to molding and to open same for ejecting the molded articles from the cavities subsequent thereto.

The mold being preheated, time is of the essence as contact of the beads causes them to grow forthwith as mold charging commences, a factor which has in the past seriously complicated mold filling procedures. Furthermore, economy considerations dictate that, in most cases, each molding cycle be productive of a plurality of articles, an objective gained by the use of a mold with multiple cavities, but such may present other difficulties, some being relatively massive and thus offering considerable thermal lag which, of course, lengthens the molding cycle and hence affects the ultimate cost of the so-molded articles. Further, with respect to multiple cavity molds, filling may, according to some procedures, be relatively insufficient, resulting in time consuming operations and frequently in incomplete or otherwise unsatisfactory filling, all so as to effect adversely the economy picture.

Another consideration is that the cavity filling subassembly, in the form of a reciprocable slide runner, may be located in some cases on the movable mold half, and in other instances, may be located on the stationary mold half. In either case, means has to be provided for salvaging the surplus or unused beads. That is, the beads in excess of those needed to fill the cavity for a single molding operation have to be exhausted from the machine and returned back to the bead supply hopper for reuse. Such an exhaust subassembly preferentially is one adapted for use regardless of the situs of the slide runner.

This invention provides means whereby the bead exhausting assembly is adapted to serve either the situation where the slide runner is located on the movable mold half or the situation where the slide runner is located on the stationary mold half.

The charging or loading of the molds is achieved by a stream of compressed air which entrains the beads and leads them to the cavities, the supply of such air being cut off when the mold cavity is full, with the excess beads being then returned to the bead supply for recycling.

Beads have been heretofore loaded into the mold in various manner, an important one of which has been by the use of a nozzle or filler affixed to the mold and receiving a supply of compressed air which flows through the nozzle and into the mold and draws therewith the beads to the nozzle and into the mold via a venturi or suction action, all necessitating a ramming function in the course of driving the beads.

Here, a suitable vertically-disposed slide runner groove or recess or channel is provided in one or the other of the mold halves for the reciprocation therewithin of a slide runner, which groove communicates with and is fed by a supply conduit leading from a bead supply hopper (usually at the upper feed end of the mold half), and also communicates with and feeds into the cavity or cavities, and also communicates with and delivers to a return conduit leading back to the bead supply hopper (usually at the lower drain end of the mold half).

The slide runner is a reciprocating member designed to provide a gating function in the respect that it breaks communication between the groove proper and the cavity or cavities when it is in a non-filling or molding position and allows communication between groove and cavity only when it is in the filling or loading or charging position.

The slide runner groove must be cleared of any excess beads not charged into a cavity so as to preclude formation of any solidified residue within the groove during the foaming program.

In conveying the beads to the molding cavity or cavities, difficulties have been encountered in prior art systems in the metering of same. One of the factors contributing thereto has been the imperativeness that the molding machine operate at a comparatively high speed so as to mold a large number of molded items in a minimum of time for a commercially practicable and economic production. This invention allows exceptionally rapid cavity charging in timed synchronism with the related movements of the other machine instrumentalities so that an optimum high production rate is attained.

DESCRIPTION OF THE PREFERRED EMBODIMENT

Figure 1:
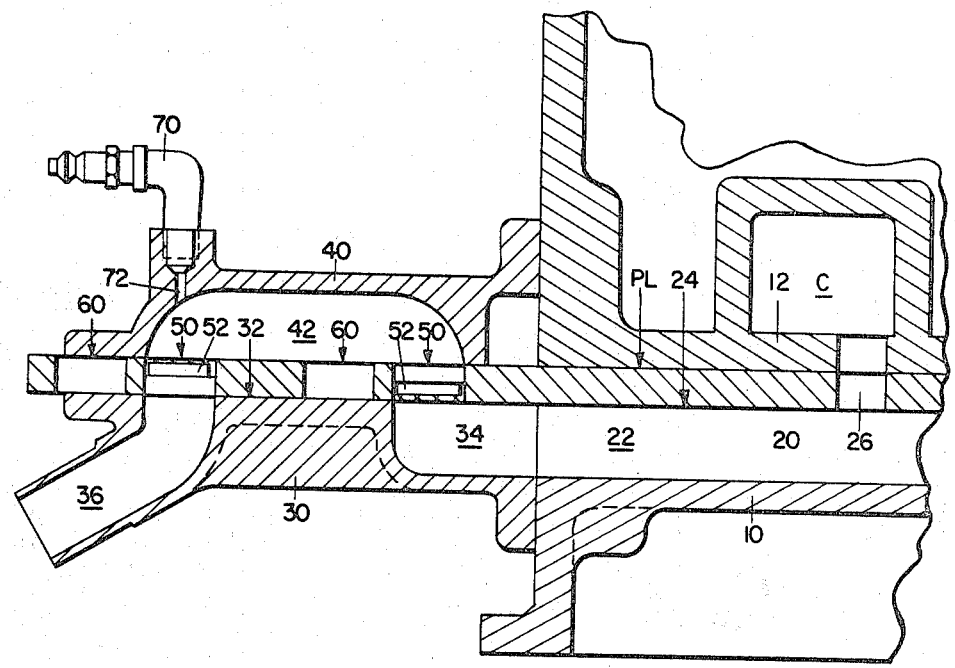
FIG. 1 is a fragmentary sectional view through the stationary and movable mold halves of a molding machine, with the slide runner seated in the runner groove on the stationary mold half and being in cavity-filling position.
Figure 2:
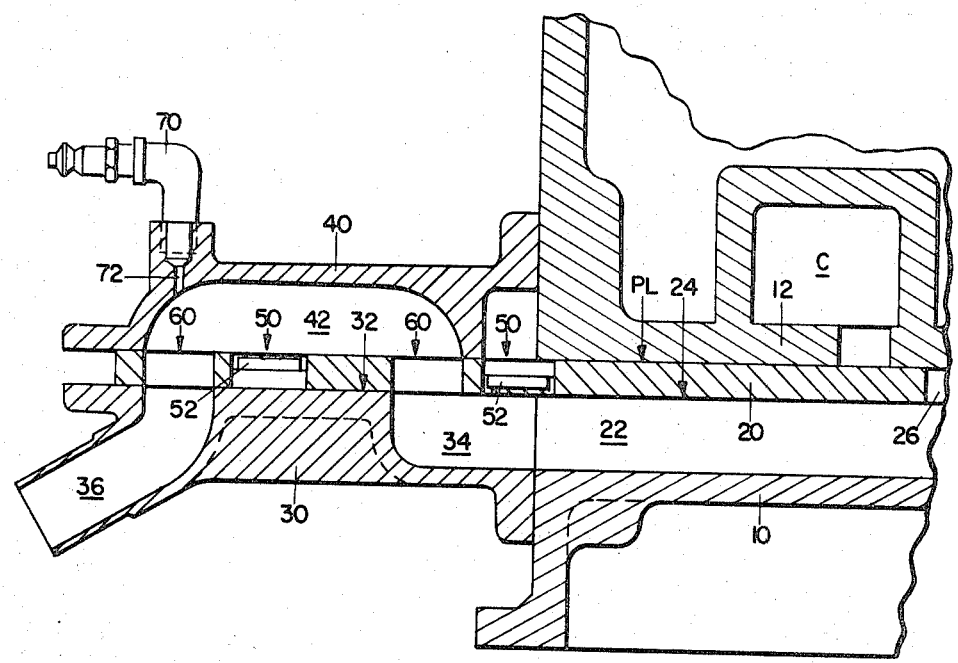
FIG. 2 is a fragmentary sectional view, similar to FIG. 1, but showing the slide runner in non-filling position.

Referring to FIGS. 1 and 2 of the drawings, the molding apparatus may be of a known type used for foam molding and envisioning opposing and complementary mold halves, one of which is stationary and is numbered 10, and one of which is movable, normally in a horizontal plane towards and away from the stationary mold half, and is numbered 12, said mold halves being mounted and supported in opposition and in register with one another on conventional mold supports of a power-operated press (not shown).

The mold halves which are vertically-disposed cooperate with each other and are partible at a parting line PL, stationary mold half 10 being carried by a normally vertically-disposed fixed or stationary head platen (not shown) to which it is removably secured at the inwardly-facing face thereof, and movable mold half 12 being carried by a normally vertically-disposed movable head platen (not shown) to which it is removably secured at the inwardly-facing face thereof.

The mold or die is formed by juxtaposing the oppositely-facing, forwardmost working faces of mold halves 10 and 12 into confronting or closed relationship with each other, one or both working faces being provided with suitable depressions which may give same certain female characteristics complementary to suitable projections in the other or both working faces, which projections may give same certain male characteristics, all in manner to define therebetween a cavity or cavities C of predetermined size and configuration to yield the desired article or articles to be molded or formed therein.

Both mold halves are preferentially suitably jacketed and provided with inlets and outlets for ingress and egress respectively of steam for mold heating and/or water for mold cooling.

A slide runner and bead exhaust arrangement meets the requirements of the particular type of plastic material contemplated for use herewith, namely a granulated preexpanded bead-like substance. The beads being fluent, i.e. capable of flowing as a stream, the principle of filling or charging is to entrain such beads in an air-stream to allow their flow into a mold cavity and to fill all portions with a substantially equal density thereof.

A slide runner 20, nestably seated in a suitable slide runner groove 22 in stationary mold half 10, comprises a bar-like member which may be reciprocated vertically within the slide runner groove extending inwardly of the working face of the mold half from the upper feed end to the lower drain end thereof. Such slide runner groove may be provided with a pair of oppositely-facing side walls, each of which is stepped to define coplanar shoulders 24 on which the slide runner may seat and relative to which it may slide so as to define within the slide runner groove a channel enclosed by the slide runner and extending vertically from the upper feed end to the lower drain end of the mold half. The stepping of the shoulders in the channel may be varied so as to allow accommodation of a slide runner of greater or lesser thickness for any specific application.

Slide runner 20 will be normally made from aluminum, although other metals might be employed. To avoid galling, when used in an aluminum mold half, the slide runner preferentially will be anodized so as to provide an aluminum oxide skin.

Slide runner 20 will be slideably reciprocated relative to the supporting mold half between what is identified as a non-charging or molding or cooking position and what is identified as a charging or filling position by means of an air cylinder of conventional design (not shown), which air cylinder will be operationally controlled by electrical timers and valves (not shown, same not forming a part of the invention). The slide runner serves as a gating means, being provided with a plurality of spaced, transversely-extending discharge openings or gates 26 along its length at one or both of its sides, each being of design to offer communication therethrough from within the slide runner groove to each cavity C, when the slide runner is in a charge position, and to preclude such communication when the slide runner is elevated or lowered by vertical reciprocation to a no-charge position so that the discharge openings are out of registry with their respective cavities.

The slide runner groove is closed at the upper feed end of the stationary mold half by a bead feed connecting pipe (not shown) which is stationarily connected to the mold half and allows communication with the slide runner groove and with a bead supply hopper (not shown), in which hopper the beads are stored preliminary to molding and from which they are aspirated through the bead feed connecting pipe and into the groove.

To supply material to the slide runner groove, the bead supply hopper may be supplied with a feeder bowl, which is activated contemporaneously with the slide runner. This feeder bowl, when activated, performs a venturi action, sucking beads from the bead supply hopper and blowing them under pressure to and through the bead feed connecting pipe and to the slide runner groove and thence into the cavity or cavities.

Boost means (not shown) may be provided for insuring a uniform packing of each cavity in the form of a small nozzle which supplies a jet of boost or secondary feed air blowing from the back of a mold face opposite a cavity through the slide runner groove and through the opening in the slide runner and into the cavity, the nozzle being connected to a suitable line for supplying pressurized air which would be separately controlled, both with respect to pressure and to time, so as best to serve the particular needs of the mold.

At the lower drain end of the stationary mold half, an exhaust bracket 30 is clamped thereto as by suitable bolting and is provided with a slide runner recess 32 to accommodate the lowermost end of slide runner 20 and is also provided with a slide runner groove 34 which is alignable with and communicates with slide runner groove 22 of stationary mold half 10 and with the slide runner recess.

Distantly of slide runner groove 34, a bead discharge connection 36 is provided to extend through the body of exhaust bracket 30 and communicates with slide runner recess 32.

At the lower drain end of movable mold half 12, a crossover bracket 40 is suitably clamped thereto to define a bracket which is alignable with exhaust bracket 30 in manner so that the two brackets jointly enclose slide runner 20 therebetween.

Additionally, an enclosed groove 42 is provided within crossover bracket 40.

The lower extremity of slide runner 20 is provided with a pair of spaced charge openings 50 extending therethrough, which openings are vented as by screens 52 for preventing the unwanted passage of beads therepast.

Additionally, the slide runner is provided with a second pair of spaced non-charge openings 60 extending therethrough.

Crossover bracket 40 mounts a runner blow down compressed air inlet 70, same being connected via flexible air line (not shown) to a suitable source of compressed air (not shown) and communicating with groove 42 by a drilling in the crossover bracket which serves as a constricted orifice to allow air discharge into the groove at high velocity and at a right angle to the main groove axis so as to develop a suction for drawing the beads through the groove.

As the filling of cavity C is being accomplished slide runner 20 is positioned in charging or loading position (FIG. 1) so that any beads within slide runner groove 22 and not being charged into the cavity will be precluded from passage beyond slide runner groove 34 by means of screen 52 in charge opening 50 of the slide runner.

After the filling of cavity C has been accomplished and slide runner 20 has been withdrawn to molding position (FIG. 2), the beads remaining in the slide runner groove must be exhausted. At this time, runner blow down air is introduced to the system, via runner blow down compressed air inlet 70 and into groove 42, which results in the beads being blown to and through the bottom end of slide runner groove 22 and through slide runner groove 34 and thence through one opening 60 and through groove 50 and out the other opening 60 and into bead discharge connection 36 for return to the bead supply hopper. During this interval, and during this interval only, the runner blow down slide is opened to permit the beads to return to the bead supply hopper.

Sequentially, the mold filling procedure envisions the closing of the mold halves in tight clamp position. When the molds are in proper position, the feeder bowl opens and the slide runner is moved into filling position. The feed air comes on and blows beads from the bead supply hopper to the slide runner groove and through the slide runner gates into the cavities until such time as the cavities are full. At some time during this period, a boost or secondary feed air may assist in the filling of the cavities, then the feeder bowl shuts off and the slide runner is retracted to molding or cooking position. Therefollowing, the flow of air serves as bead blow down air with the bead blow back device being open so that the residuary beads are blown free of the slide runner and returned to the bead storage hopper. The steam for molding purposes then enters the mold wherefore the molding procedure proceeds to its conclusion.

Figure 3:
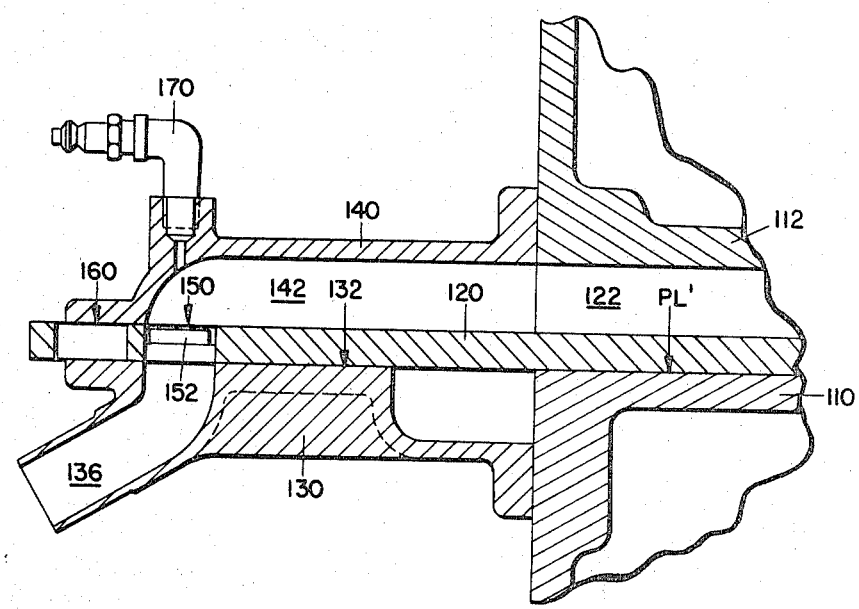
FIG. 3 is a fragmentary sectional view through the stationary and movable mold halves, with the slide runner seated in the runner groove on the movable mold half and being in cavity-filling position.
Figure 4:
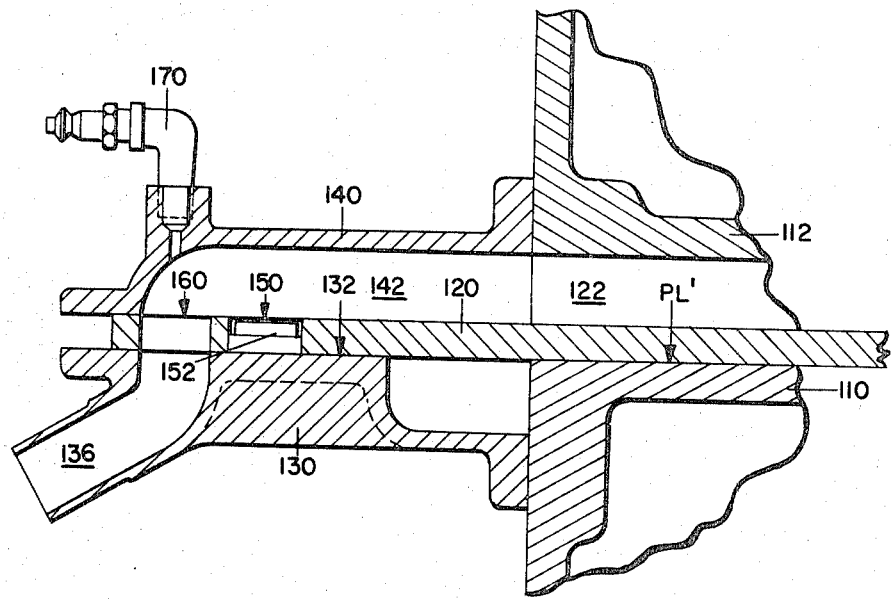
FIG. 4 is a fragmentary sectional view, similar to FIG. 3, but showing the slide runner in non-filling position.

Referring to FIGS. 3 and 4, I have shown complementary mold halves, one of which is stationary and is numbered 110, and one of which is movable, and is numbered 112, the mold halves being supported in opposition and in register with one another.

The mold halves cooperate with each other and are partible at a parting line PL'.

The mold or die is formed by juxtaposing the oppositely-facing, forwardmost working faces of mold halves 110 and 112 into confronting relationship with each other, one or both working faces being provided with suitable depressions and/or projections to define therebetween a cavity or cavities.

A slide runner 120 is nestably seated in a suitable slide runner groove 122 in movable mold half 112, same being reciprocated vertically within the slide runner groove extending inwardly of the working face of the supporting mold half from the upper feed end to the lower drain end thereof. Such slide runner groove may be provided with stepped side walls to define coplanar shoulders on which the slide runner may seat and relative to which it may slide so as to define within the slide runner groove a channel enclosed by the slide runner.

Slide runner 120 will be slideably reciprocated relative to movable mold half between a non-charging or molding or cooking position and a charging or filling position by an air cylinder (not shown). The slide runner is the gating means, being provided with a plurality of spaced, transversely-extending discharge openings or gates along its length at one or both of its sides, each being of design to offer communication therethrough from within the slide runner groove to each cavity when the slide runner is in a charge position, and to preclude such communication when the slide runner is elevated or lowered to a no-charge position so that the discharge openings are out of registry with their respective cavities.

The slide runner groove is closed at the upper feed end of the movable mold half by a bead feed connecting pipe (not shown) which is stationarily connected to the mold half and allows communication with the slide runner groove and with a bead supply hopper (not shown), in which hopper the beads are stored preliminary to molding and from which they are aspirated through the bead feed connecting pipe and into the groove.

To supply material to the slide runner groove, the bead supply hopper may be supplied with a feeder bowl, which is activated contemporaneously with the slide runner and is controlled by a cylinder-operated slide shutoff. This feeder bowl is located on the underside of the bead supply hopper and when activated perform a venturi action, sucking beads from the bead supply hopper and blowing them under pressure to and through the bead feed connecting pipe and to the slide runner groove and thence into the cavity.

Boost means (not shown) may be provided for insuring a uniform packing of each cavity in the form of a small nozzle which supplies a jet of boost or secondary feed air blowing from the back of a mold face opposite a cavity through the slide runner groove and through the opening in the slide runner and into the cavity, the nozzle being connected to a suitable line for supplying pressurized air which would be separately controlled, both with respect to pressure and to time, so as best to serve the particular needs of the mold.

At the lower drain end of the stationary mold half, an exhaust bracket 130 is clamped thereto as by suitable bolting and is provided with a slide runner recess 132 to accommodate the lowermost end of slide runner 120, the recess being alignable with and communicating with slide runner groove 122 of movable mold half 112.

A bead discharge connection 136 is provided which extends through the body of exhaust bracket 130 and communicates with slide runner recess 132.

At the lower drain end of movable mold half 112, a crossover bracket 140 is suitably clamped thereto to define a bracket alignable with exhaust bracket 130 so as to completely enclose slide runner 120 therebetween.

Additionally, an enclosed groove 142 is provided within crossover bracket 140 which communicates with groove 122.

The lower extremity of slide runner 120 is provided with a charge opening 150 extending therethrough, which opening is vented as by a screen 152 for preventing the unwanted passage of beads therepast.

Additionally, the slide runner is provided with a second non-charge opening 160 extending therethrough.

Crossover bracket 140 mounts a runner blow down compressed air inlet 170, same being connected via a flexible air line (not shown) to a suitable source of compressed air (not shown) and communicating with groove 142 by a drilling in the crossover bracket which serves as a constricted orifice to allow air discharge into the groove at high velocity and at a right angle to the main groove axis in order there to develop a suction so as to draw the beads through the groove.

As the filling of the cavity is being accomplished slide runner 120 is positioned in charging or loading position (FIG. 3) so that any beads within slide runner groove 122 and not being charged into the cavity will be precluded from passage beyond slide runner groove 142 by screen 152 in charge opening 150 of the slide runner.

After the filling of the cavity has been accomplished and slide runner 120 has been withdrawn to molding position (FIG. 4), the beads remaining in the slide runner groove must be exhausted. At this time, runner blow down air is introduced to the system via runner blow down compressed air inlet 170 and into groove 142 which results in the beads being blown to and through the bottom end of slide runner groove 122 and through slide runner groove 142 and thence through opening 160 and into bead discharge connection 136 for return to the bead supply hopper. During this interval, and during this interval only, the runner blow down slide is opened to permit the beads to return to the bead supply hopper.

I claim:
1. In molding apparatus:
  a pair of opposing and complentary mold halves having confronting configurations together defining a mold cavity in the closed position of the mold halves;
  a two-part cross over means with a first part mounted on one of the mold halves and with a second part mounted on the other of the mold halves and mating with the first part in the closed position of the mold halves;
  a channel in at least one of the mold halves and adjacent the parting line of the mold halves and extending circuitously through the parts of the cross over means for accepting and ejecting supplies of molding material;
  reciprocably movable slide runner means disposed in the channel and slideable realtive to the mold halves and the cross over means for intersecting the channel into parts on opposite sides of the slide runner means;
  a gate in the slide runner means communicating with the channel and movable into and out of communication with the mold cavity on reciprocation of the slide runner means and simultaneously movable out of and into communication with the channel parts on opposite sides of the slide runner in the cross over means; and
  means cooperant with the slide runner means for delivering a supply of molding material under pressure into the channel and precluding passage through the cross over means when the gate is in communication with the mold cavity and delivering a supply of molding material under pressure outwardly of the channel and allowing passage through the cross over means when the gate is in noncommunication with the mold cavity.

2. In molding apparatus according to claim 1 wherein, one of the mold halves is stationary and the other of the mold halves is movable and wherein the slide means is reciprocable in a plane tranverse to the plane of movement of the movable mold half.

3. In molding apparatus according to claim 1 including, boost air means disposed within the channel at a point adjacent the discharge end of the cross over means and operative for imparting added impetus to the exhausting of excess molding material outwardly of the channel when the gate is in noncommunication with the cavity.

References Cited

UNITED STATES PATENTS

| | | | |
|---|---|---|---|
| 3,167,811 | 2/1965 | Kraus et al. | 18—5 |
| 3,189,945 | 6/1965 | Strauss | 18—30 |
| 3,220,058 | 11/1965 | Ehrenfreund | 18—30 |

H. A. KILBY, JR., Primary Examiner

U.S. Cl. X.R.

18—30